Sept. 22, 1970
C. C. BAUERLEIN
3,529,430
BELT DRIVEN ICE MAKER
Filed Feb. 5, 1968
5 Sheets-Sheet 1
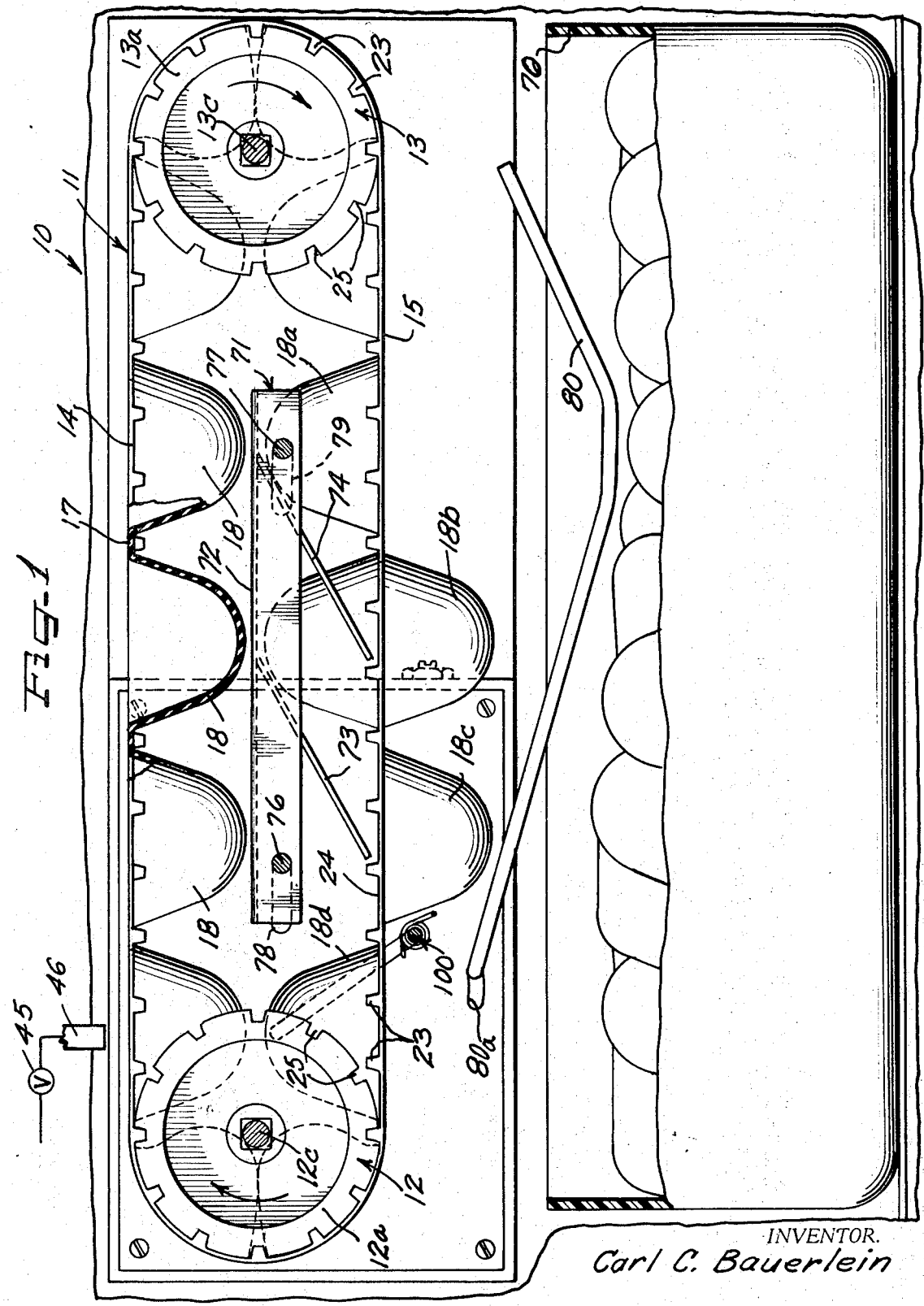
INVENTOR.
Carl C. Bauerlein
BY *Hill, Sherman, Meroni, Gross & Simpson*  ATTORNEYS Sept. 22, 1970  C. C. BAUERLEIN  3,529,430
BELT DRIVEN ICE MAKER
Filed Feb. 5, 1968  5 Sheets-Sheet 2
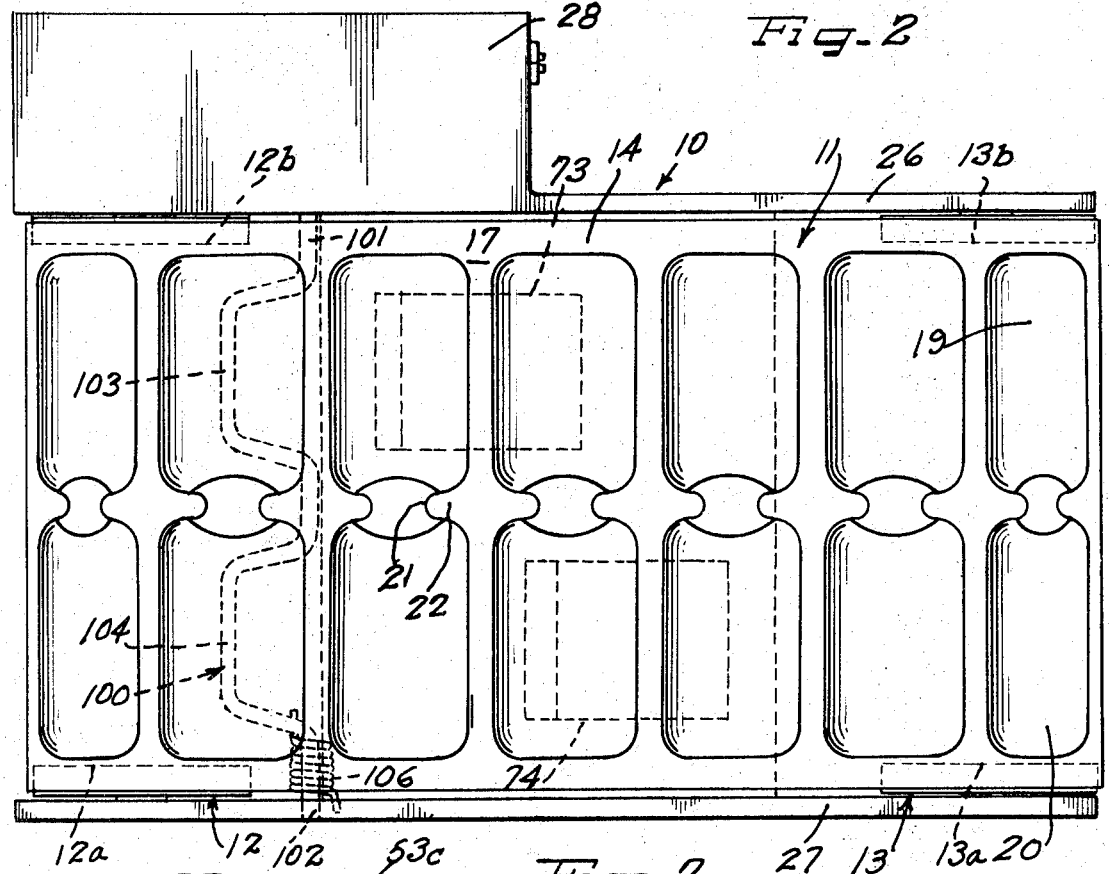
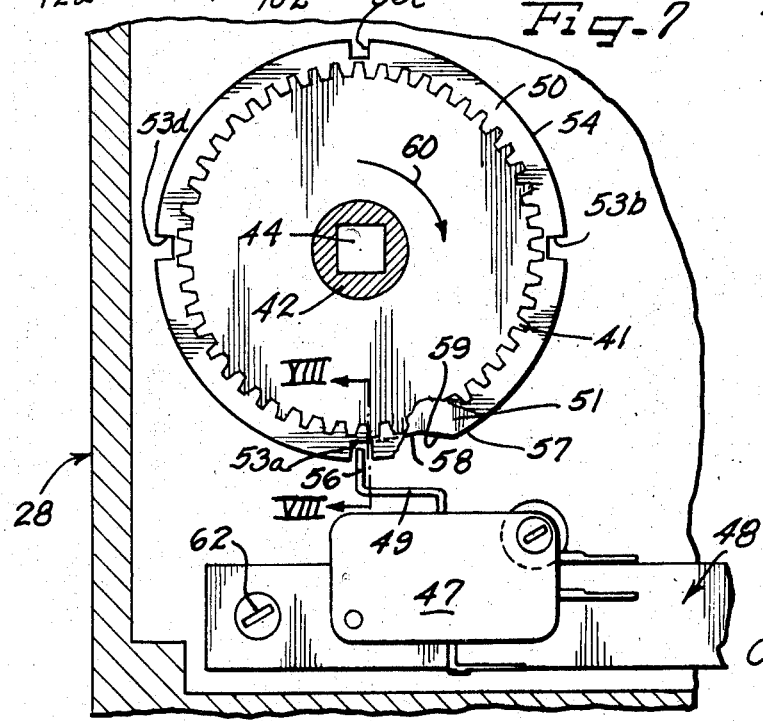
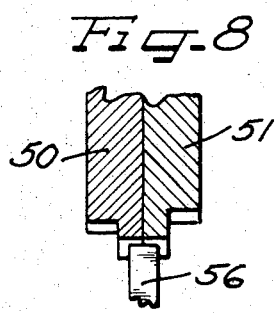
INVENTOR.
Carl C. Bauerlein
BY  ATTORNEYS

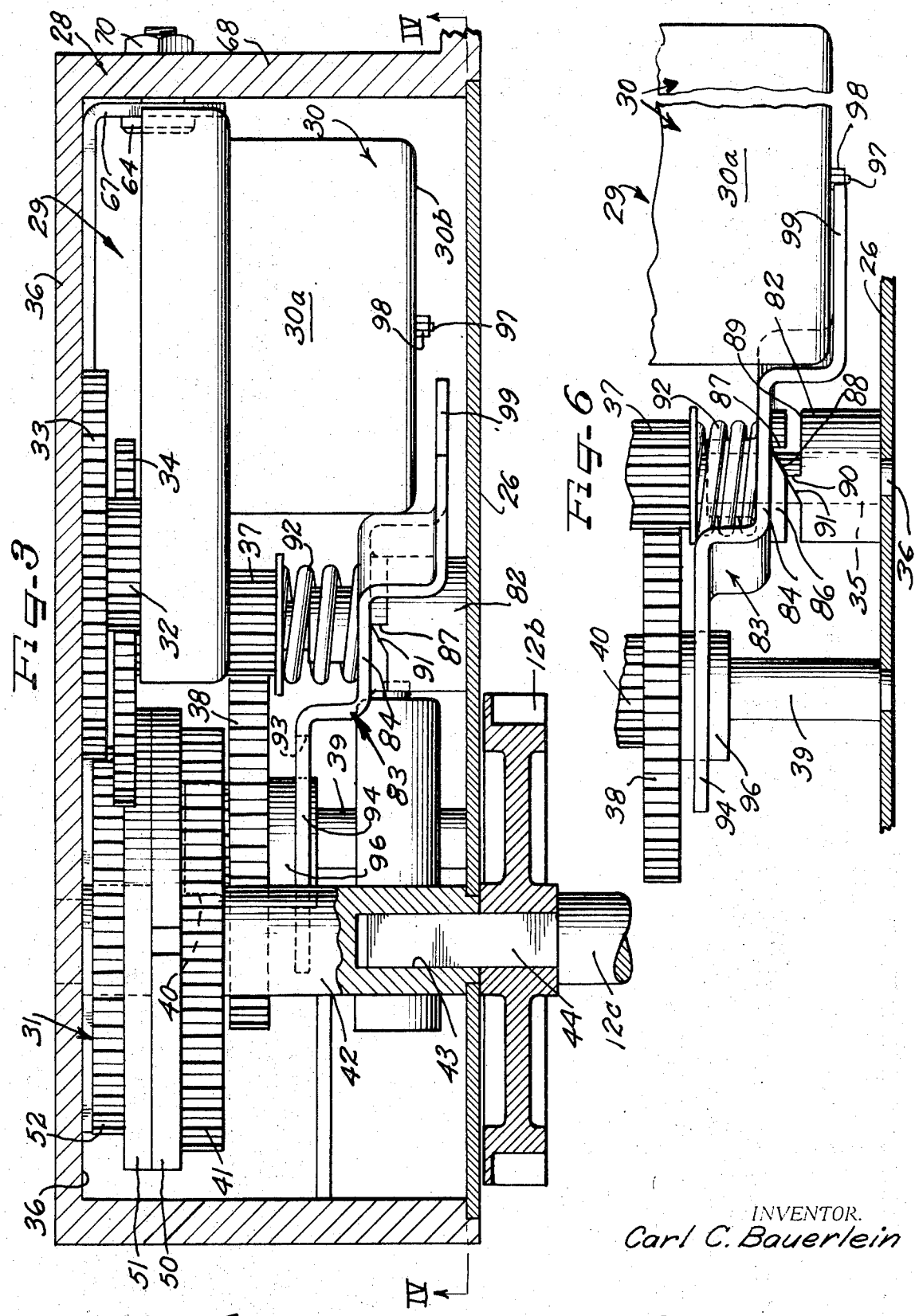

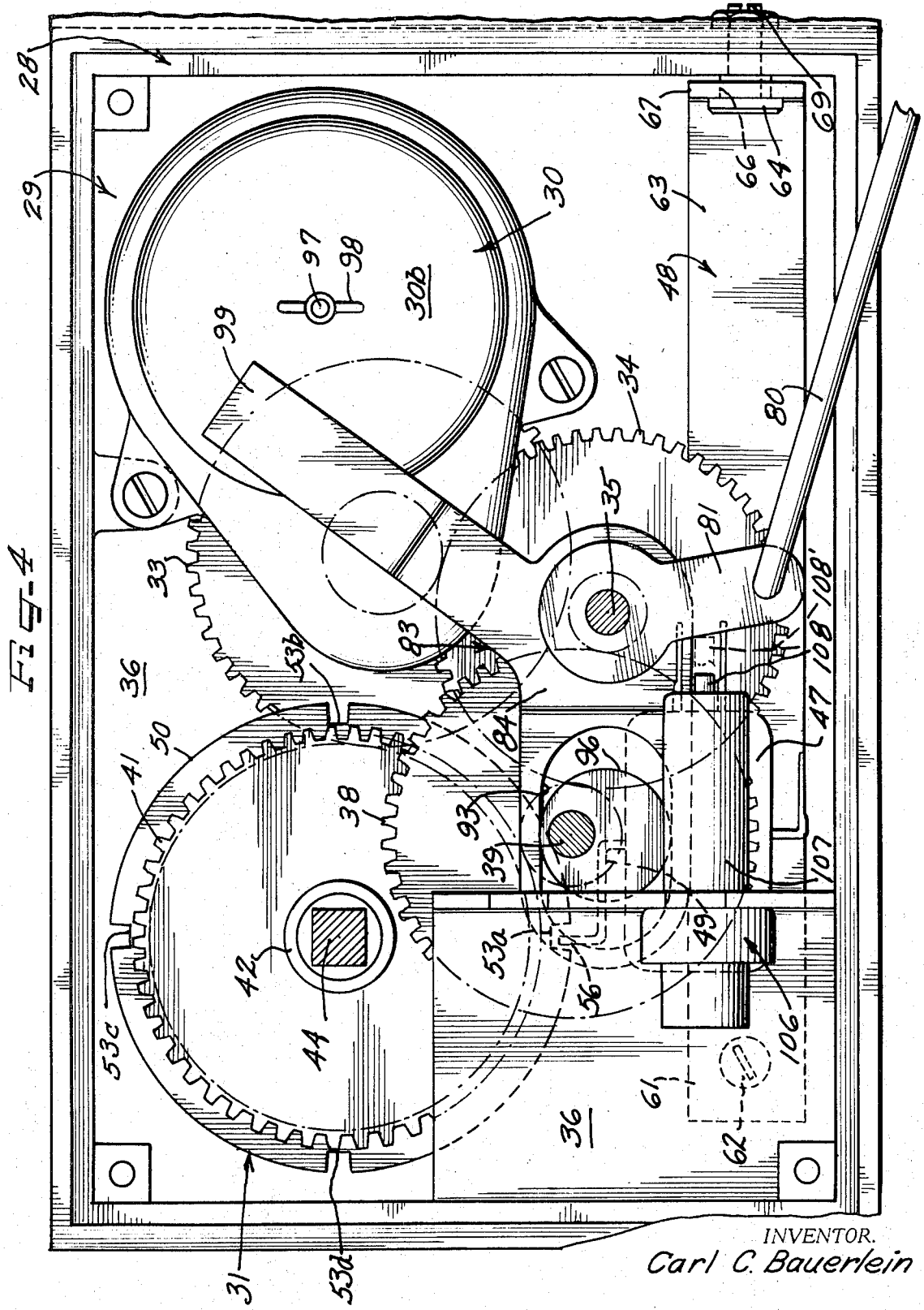

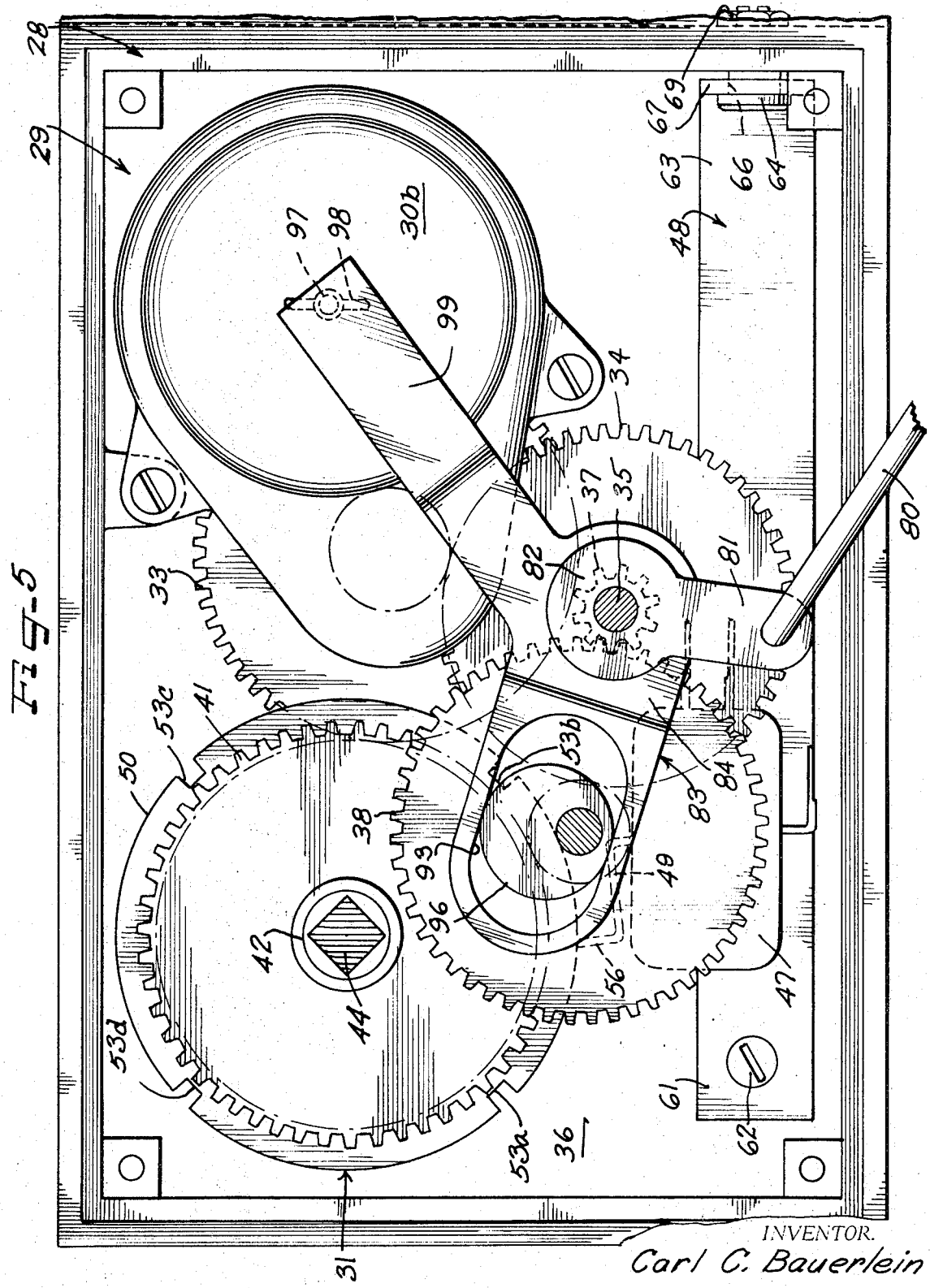

United States Patent Office 3,529,430
Patented Sept. 22, 1970

3,529,430
BELT DRIVEN ICE MAKER
Carl C. Bauerlein, Clearwater, Fla., assignor to The Dole Valve Company, Morton Grove, Ill., a corporation of Illinois
Filed Feb. 5, 1968, Ser. No. 702,914
Int. Cl. F25c 1/10
U.S. Cl. 62—137                                                    18 Claims

ABSTRACT OF THE DISCLOSURE

An automatic ice cube maker including a sprocket-driven endless belt having a plurality of flexible invertible ice cube forming cup-shaped members or cells formed therein. A water-fill station and an ice cube-harvest station are situated respectively adjacent upper and lower horizontal reaches of the belt. A stallable electric motor drives the sprockets through a gear train to move the belt continuously through a looped path of travel and past the water-fill and ice-harvest stations. A water supply mechanism for filling the cells with water comprises a pair of alignable cooperating cams which are connected to different ones of the gears of the gear train for rotation at different speeds. A water control switch controls the operation of the water supply mechanism so that a predetermined amount of water is supplied to each of the cells as each cell passes through the water-fill station in timed relation with the alignment of the cams. Rigid abutment members are provided at the harvest station to invert the cells or cup-shaped members or turn them inside out to remove the frozen cubes therefrom. A spring biased member is provided beyond the harvest station to re-invert or return the cup-shaped members to the original position thereof. The spring bias member includes a stripper for ensuring complete removal of the cubes from the cells. An ice level sensing mechanism is also driven by the gear train to physically stop the rotation of the motor when the ice at the harvest station has attained a predetermined level, but only when the cam members are out of alignment with one another and the water control switch is inoperative to avoid over-flowing of the cup-shaped members at the water-fill station.

BACKGROUND OF THE INVENTION

This invention pertains generally to the field of automatic ice cube makers and more particularly to such ice makers employing a continually or continuously moving endless belt having ice cube cells or cube-forming members formed therein or carried thereby.

Automatic ice cube makers of this general description and including the features essential to provide automatic operation such as, for example, means for automatically removing the frozen cubes from the cube-forming members, means for automatically filling the empty cube-forming members with water and means for automatically terminating the operation of the ice cube maker when a given quantity of cubes has been collected, are known in the prior art. All of such ice cube makers of which I am aware, however, include relatively complicated operating mechanisms which tend to increase the likelihood of malfunction, increase manufacturing costs and increase maintenance problems. As a consequence many of such ice makers have been relatively slow in gaining consumer acceptance and the use of automatic ice cube makers, particularly in household appliances, is not as widespread as it otherwise might be.

SUMMARY AND OBJECTS OF THE INVENTION

It is a broad object of the present invention to increase the use of automatic ice cube makers, particularly in household appliances such as refrigerators, by reducing manufacturing and maintenance costs, by reducing the likelihood of malfunction and by increasing the operating life of such apparatus.

Another object is to provide simplified means for accurately filling the cube-forming members with water at the proper point in time of an ice making cycle.

Another object is to provide simplified means for terminating the operation of the ice maker after a predetermined quantity of ice cubes has been collected.

Another object of the present invention is to provide simplified means for removing the frozen ice cubes from the cube-forming members.

A further object of the invention is to provide an ice maker of more rugged construction capable of continued use over a long period of time.

With these and other objects in view the present invention may be briefly summarized as comprising means forming cells for receiving water and forming ice cubes therein, means operable to supply water to the cells, means operable to remove the frozen cubes from the cells, drive means for operating the water supply means and the cube removing means in timed relation and means for stopping the operation of the ice maker when a given quantity of harvested ice cubes has been collected including a member mounted for pivotal and axial movement on a shaft and means including means connected to said drive means for moving the member pivotally on the shaft between two operating positions each time cubes are removed from the cells and for moving the member axially to a stopping position when said given quantity of cubes has been collected to effect stoppage of the operation of the ice maker.

The cells in which the ice cubes are formed comprise flexible invertible cup-shaped members formed in an endless belt which is looped around a pair of rotatable sprocket members in driving relation so that as the sprocket members are rotated the belt moves through a looped path of travel. The sprocket members are driven through a gear train by a continuously operating electric motor and the movable member of the ice maker stopping means physically stops the operation or rotation of the motor when a predetermined quantity of cubes has been collected.

The water supply means are adapted to fill the cells at a predetermined point in the path of travel of the belt, and the cube removal means is displaced from the water supply means so that the time interval required for each of the cells to move from the water supply means to the cube removal means is greater than the time required for the water in the cells to freeze into cubes.

For controlling the operation of the water supply means the present invention features a pair of control members or rotatable cams mounted respectively for joint rotation on different ones of the drive gears. The gears on which the cams are mounted operate at different speeds so that the cams rotate relative to one another.

Cooperating or mutually alignable cam surfaces are formed on the cam members. Due to the relative rotation of the cams the cam surfaces come into a given operating alignment with one another periodically. An electric switch associated with the cams is actuated by the cam surfaces in the aligned positions thereof to control the operation of the water supply means.

The ice cube removal means comprises rigid abutment members in the path of travel of the flexible cup-shaped members for engaging and forcing the cup-shaped members outwardly of the belt to dislodge the cubes. A spring bias member is provided beyond the rigid abutment members for stripping the cubes from the cup-shaped members and for engaging and urging the empty cup-shaped members back to their original position inwardly of the belt.

Many other features, advantages and additional objects of the present invention will become manifest to those versed in the art upon making reference to the detailed description which follows and the accompanying sheets of drawings, in which preferred structural embodiments incorporating the principles of the present invention are shown by way of illustrative example only.

BRIEF DESCRIPTION OF THE DRAWINGS

FIG. 1 is a side elevational view of an automatic ice cube maker constructed in accordance with the principles of the present invention with parts thereof shown in section.

FIG. 2 is a top plan view of the ice maker shown in FIG. 1.

FIG. 3 is a top plan view of the drive mechanism of the ice maker with parts shown in section.

FIG. 4 is a sectional view taken substantially along lines IV—IV of FIG. 3 showing the drive mechanism in one operating position.

FIG. 5 is similar to FIG. 4 but shows the drive mechanism in another operating position.

FIG. 6 is an enlarged fragmentary top plan view of a portion of the drive mechanism shown in FIG. 3.

FIG. 7 is a fragmentary view of the drive mechanism as viewed in FIGS. 4 and 5 but with certain parts removed to emphasize other parts of the drive mechanism.

FIG. 8 is an enlarged sectional view taken along lines VIII—VIII of FIG. 7.

DESCRIPTION OF THE PREFERRED EMBODIMENT

Referring initially to FIGS. 1 and 2, an automatic ice cube maker constructed in accordance with the principles of the present invention is indicated generally at reference numeral 10.

The ice maker 10 may be more particularly characterized as comprising an endless belt 11 looped around a pair of horizontally spaced sprocket mechanisms 12 and 13 to provide upper and lower reaches 14 and 15 of the belt 11.

The belt 11 may be more particularly characterized as comprising a sheet-form member 17 in which are formed a plurality of flexible ice cube-forming cells or cup-shaped members 18 spaced from one another along the length of the member 17. The ice cubes are formed within the cells 18 and the entire belt 11 is adapted to be located in the freezer compartment of suitable refrigeration apparatus such as a household refrigerator. The cells 18 are preferably made of rubber although other materials such as certain plastics may also be advantageously utilized.

In the embodiment illustrated the belt 11 comprises two longitudinally extending columns of cells 18. The two columns which are disposed in side-by-side relation across the width of belt 11, are indicated respectively at reference numerals 19 and 20. The cells 18 of the two columns are aligned with one another transversely of the belt 11 and communicate with one another through a narrow neck 21 formed in a common divider wall 22.

The belt 11 comprises a plurality of longitudinally spaced lugs 23 formed on an inside surface 24 of the sheet-form member 17 and adapted to be received in complementarily shaped grooves 25 formed in the sprocket mechanisms 12 and 13. By means of these lugs and grooves the belt 11 is driven by the sprocket mechanisms 12 and 13 continuously through a closed loop or an endless path of travel.

The sprocket mechanism 12 comprises a pair of sprockets 12a and 12b (FIG. 2) mounted for joint rotation on a shaft 12c which is journalled at opposite ends on a pair of spaced side walls 26 and 27 of the ice maker 10. The sprocket mechanism 13 comprises a similar pair of sprockets 13a and 13b mounted for joint rotation on a rotatable shaft 13c which extends between and is journalled on the side walls 26 and 27. The grooves 25 which receive the lugs 23 of the belt 11 are formed in all of the sprockets 12a, 12b, 13a and 13b.

The drive mechanism for the ice maker 10 is enclosed within a housing 28 which extends outwardly normally of the side wall 26. The drive mechanism, which is indicated generally at reference numeral 29 in FIGS. 3–6, serves to continuously turn the sprocket mechanism 12 at a very low rate of speed, thereby continuously moving the belt 10 through its path of travel.

The drive mechanism 29 comprises a continuously operating electric motor 30 connected to the shaft 12c of the sprocket mechanism 12 through a speed reducer gear train indicated generally at reference numeral 31. In the illustrated embodiment the motor 30 is adapted to operate at the very low speed of one revolution per hour.

A gear 32 of the gear train 31 is mounted on a housing 30a of the motor 30 and is driven by the armature of the motor at 1 r.p.m. through a speed reducer situated within the housing 30a. In the embodiment illustrated the gear 32 has 16 gear teeth and is formed integrally with a larger gear 33 which also operates at 1 r.p.m. and which has a total of 52 gear teeth.

The smaller gear 32 engages in meshing relation a larger gear 34 which has 48 gear teeth and which rotates ⅓ r.p.m. or 20 r.p.h. (revolutions per hour).

The gear 34 is mounted fast to a shaft 35 which is journalled at one end 36 in the sidewall 26 and at an opposite end in a side wall 36 of the housing 28.

Formed integrally with a gear 34 is a smaller gear 37 which also turns at ⅓ r.p.m. or 20 r.p.h. The gear 37, which has a total of 10 teeth, meshes with a larger gear 38 mounted for joint rotation on a shaft 39 journalled at the ends thereof on the side walls 26 and 36. The gear 38 has a total of 50 teeth and turns at 4 r.p.h. A smaller gear 40 is formed integrally with the gear 38 to turn at 4 r.p.h. and has a total of 14 gear teeth.

The gear 40 engages a larger gear 41 having a total of 56 teeth. Thus the gear 41 rotates at 1 r.p.h.

The gear 41 is connected in driving relation to the shaft 12c of the sprocket mechanism 12 by means of a coupling shaft 42 having a squared bore 43 for receiving a squared end 44 of the shaft 12c. The sprocket 12b is also mounted on the squared end 44 of the shaft 12c adjacent the coupling shaft 42.

To fill the various ice cube-forming cells 18 with water a water supply tube 46 is located above one of the cell columns 19 and 20 located in the upper reach 14 of the belt 11. Since the adjacent cells 18 of the columns 19 and 20 communicate with one another through the narrow interconnecting necks 21 as shown in FIG. 2, only a single water tube 46 is required in order to fill both of the cell columns 19 and 20.

In the embodiment illustrated each of the columns 19 and 20 includes 14 ice cube cells 18 and the belt 11 moves about its looped path of travel at the rate of 6 and ⅝" per hour. An electrically operated valve 45 is mounted in the conduit or tube 46 to control the flow of supply water to the cells 18 so that each pair of laterally adjacent cells 18, 18 are supplied with a predetermined quantity of water just as the cells pass beneath the tube 46.

Operation of the shut-off valve 45 is controlled by means of an electric water control switch 47 electrically connected therewith. The switch 47 is mounted on a mounting arm 48 and comprises a biased actuating lever 49 which, when depressed inwardly toward a housing 47a of the switch to the position thereof shown in FIG. 5, serves to shut-off the valve 45 and which, when biased outwardly of the housing 47a to the position thereof shown in FIG. 7, serves to open the valve 45 to supply water to the cells 18.

Actuation of the lever 49 is controlled by a pair of generally circularly shaped cam members 50 and 51. Cam 50 is mounted fast to the shaft or coupling 42 for joint rotation with the gear 41. The cam member 51, on the other hand, is relatively rotatably carried on the shaft 42 and is formed integrally with a gear 52 in meshing relation with the gear 33. Gears 33 and 52 both have 52 teeth and both turn at 1 r.p.m.

Since the cam 50 rotates at 1 revolution per hour and the cam 51 rotates at 1 revolution per minute the two cam members rotate relative to one another. Four grooves or cam surfaces 53a–53d are formed in a peripheral wall 54 of the cam member 50. The grooves 53a–53d are equally spaced around the circumference of the cam member 50. As a consequence every fifteen minutes one of the four grooves 53a–53d is aligned with an upturned finger 56 of the switch actuating lever 49.

The cam member 51 also has a recess or cam surface formed in an outer peripheral wall 57 thereof. This latter cam surface, indicated in FIG. 7 at reference numeral 58, has a greater circumferential width than the widths of grooves 53a–53d formed in cam member 50 and comprises an inclined wall or ramp indicated at 59.

In operation the cam members 50 and 51 rotate in the direction of the arrow indicated at reference numeral 60 in FIG. 7. As noted in FIG. 8 the upturned finger 56 of the switch actuating lever 49 straddles the two cam members 50 and 51. Thus the finger 56 rides on one of the peripheral cam walls 54 and 57 to maintain the actuating lever 49 in the position thereof shown in FIG. 5 except when the recess 58 of the cam member 51 is axially aligned with one of the grooves 53a–53d adjacent the upturned 50.

Although the cam member 51 rotates at one revolution per minute, the recess or cam surface 58 thereof is aligned with one of the grooves 53a–53d adjacent the upturned finger 56 only once every fifteen minutes. Thus the actuating lever 48 is biased to the position thereof shown in FIGS. 4 and 7 to open the valve in the conduit or tube 46 only once every fifteen minutes. This is also the length of time required for successive pairs of laterally adjacent ice cube cells 18 to move past the outlet of the tube 46.

The length of time during which the shut-off valve 45 is open is determined by the length of time during which the recess or cam surface 58 of the cam member 51 is aligned with one of the grooves 53a–53d of the cam member 50. In the embodiment illustrated the recess 58 is sufficiently wide to maintain the actuating lever 49 in the operating position thereof shown in FIG. 7 for a period of about ten seconds. The width of the recess 58 can, of course, be changed to open the valve 45 for longer of shorter period of time to accommodate variations in water pressure, sizes of the ice cube cells 18 and other variables.

This time period can also be varied within limits by adjusting the arm 48. As shown in FIGS. 3–5, one end 61 of the arm 48 is pivotally mounted on a stud 62 which projects inwardly from the housing wall 36 and the opposite end 63 is mounted on a short eccentric shaft 64 which is received in a bore 66 formed in an inturned flange 67 of the arm 48. The eccentric shaft 64 extends through an end wall 68 of the housing 28 and is provided with a slit formed in a threaded end 69 thereof for adjustment by means of a screwdriver or the like tool. A nut 70 is provided to lock the shaft 64 in place.

By rotating the shaft 64, the arm 48 can be pivoted within limits about the stud 62, thereby varying the spaced relation and the angle between the switch 47 and the cams 50 and 51. In the embodiment illustrated, movement of the switch 47 slightly upwardly has the effect of decreasing the angle of rotation of the cam member 51 through which the valve 45 is open. Conversely, downward movement of the switch 47 has the effect of maintaining the valve 45 open for a longer period of time.

As the water-filled ice cube forming cells 18 travel across the upper reach 14 of the belt 11 the water therein freezes into cubes. The cube-filled cells then pass around the sprocket mechanism 13 to the lower reach 15 of the belt 11.

In the upper reach 14 the cells 18 are disposed inwardly of the belt 11. In the lower reach 15, however, the cube-filled cells are forced outwardly of the belt whereby the cubes are dislodged from the cells to fall to a collection basket as indicated at reference numeral 70 located below the belt 11.

Apparatus which may be designated a harvest station is situated within the loop of the belt 11 adjacent a center portion of the lower reach 15. The harvest station is indicated generally at reference numeral 71 and comprises a rigid plate 72 extending between the sidewalls 26 and 27. A pair of cut outs 73 and 74 form rigid abutment members inclined downwardly toward and in the direction of movement of the lower reach of the belt. The abutment members 73 and 74 are disposed respectively below columns 19 and 20 of the ice cube cells 18 and are staggered or offset from one another in the direction of travel of the lower reach 15 as indicated in FIGS. 1 and 2.

The ice harvest station 71 and more particularly the rigid abutment members 73 and 74 perform the function of forcibly inverting the cube filled cells 18 as the cells move along the lower reach of the belt 11.

For example, in the portions thereof shown in FIG. 1 one of the cube-filled cells indicated at reference numeral 18a is about to engage its corresponding abutment member 74. As the cell 18a moves from right to left as viewed in FIG. 1 the abutment member 74 depresses the cell to force it outwardly of the belt 11 to an inverted position as indicated at 18b. This inversion of the flexible cell has the effect of dislodging the cube carried thereby so that it drops into the collection basket 70. A pair of guide rails may be provided along the margins of the lower belt reach 15 to bottom the belt if necessary to avoid undue downward deflection as the abutment members 73 and 74 engage the cube-filled cells 18.

Because of the staggered or offset relation of the abutment members 73 and 74 the cubes which are harvested from the two cell columns 19 and 20 fall at different locations into the collection bin 70, thus tending to provide a more level accumulation of ice cubes in the bin 70.

Means including a pair of studs 76 and 77 extend from the sides of the plate 72 through elongated slots 78 and 79 formed in the side walls 26 and 27 in order to accommodate limited movement of the plate 72 for selectively varying the location within the collection bin 70 in which the cubes are dropped and the abutment members 73 and 74 can, of course, be spaced from each other a greater or lesser distance as desired.

The present invention also contemplates the provision of means for sensing the level of the collected ice cubes and for stopping the operation of the ice maker 10 after a predetermined quantity of cubes has been collected in the bin 70.

As illustrated in FIG. 1 an elongated ice level sensing rod or arm 80 projects through a slot 80a formed in the side wall 26 and extends substantially across the top of the collection bin 70. During each period in which a supply of water issues from the tube 46 to a pair of empty cells 18 and in which a pair of cubes are dislodged at the harvest station 71 to drop into the bin 70 the arm 80 moves from a raised position as shown in FIGS. 1 and 4 to a lowered position as shown in FIG. 5 and back again to the raised position. The arm 80 is bent as shown to engage the cubes in the collection bin 70 only after a given quantity has been accumulated. If the rod 80 does not engage the cubes as it moves from its raised to its lowered position, the operation of the ice maker continues. When the arm 80 does engage the ice, however, the impediment to movement of the arm offered by the ice has the effect of terminating the operation of the ice cube maker 10 until a sufficient quantity of cubes has been removed from the bin 70 to enable the arm 80 to move to its lowered position.

As shown in FIGS. 3–6, the sensing arm 80 is securely connected in fixed assembly to a flange 81 depending from a tubular collar 82 carried for relative rotation on the shaft 35. A linkage member 83 is also pivotally carried on the shaft 35 adjacent the collar 82 and comprises a central portion 84 having formed thereon an annular member 86 comprising an axially extending wall or shoulder 87 and an axially inclined ramp 88. A radial wall 89 of the collar 82 which faces the annular member 86 also has formed thereon complementarily shaped shoulder and ramp surfaces 90 and 91.

A coil spring 92 is interposed between the central portion 84 of the linkage member 83 and the collar 82 to urge the linkage member into axial abutting engagement with the collar 82. Where the level of ice in the collection bin 70 is such that the sensing arm 80 can move easily from its raised to its lowered position the ramp and shoulder surfaces of the collar 82 and the linkage member 83 engage one another for joint pivotal movement about the shaft 35. This relative positioning of the collar 82 and the linkage member 83 is shown, for example, in FIG. 3.

It is also apparent, however, that where the linkage member 83 rotates in a clockwise direction as viewed in FIGS. 4 and 5 and the sensing arm 80 is impeded in similar movement, the collar 82 will not be free to pivot with the linkage member 83 and the ramp surface 88 will ride along the ramp 91 to urge the linkage member 83 axially away from the collar 82.

An elongated slot 93 is formed in another portion 94 of the linkage member 83 to receive an eccentric member 96 mounted for joint rotation on the shaft 39. Thus as the shaft 39 rotates during operation of the ice maker 10 the linkage member 83 is rocked or pivoted back and forth about the shaft 35.

Protruding from an end wall 30b of a motor housing 30a is an armature shaft 97 of the motor 30. A radially extending abutment member or flange 98 is mounted fast to the armature shaft 97 adjacent the end wall 30b and may be made of rubber or the like flexible material to prevent strain or damage to the armature shaft.

As the linkage 83 is pivoted from the position thereof shown in FIGS. 3 and 4, at which the sensing arm 80 is in a raised position, to the position of the linkage member shown in FIG. 5, at which the sensing arm 80 has been moved to a lowered position, an integrally formed projection or finger 99 of the linkage member 83 moves in a plane which is spaced axially of the outer tip of the armature shaft 97 and therefore does not engage the abutment member 98. On the other hand, when the sensing arm 80 engages the cubes collected in the bin 70 as it moves from its raised to its lowered position, thereby camming the linkage member 83 axially to the position thereof shown in FIG. 6, the projection or finger 99 is pivoted into engagement with the blade 98 mounted on the armature shaft 97. This abutment of the finger 99 against the blade 98 causes stalling of the motor 30, thereby stopping the operation of the ice maker. Operation resumes only when a sufficient quantity of cubes have been removed from the bin 70 to enable the sensing arm 80 to move to its lowered position, at which time the linkage member 83 moves axially against the collar 82 to move the finger 99 out of abutting engagement with the blade 98 and to release the motor 30.

The electric motor 30 may be of the synchronous type to provide a torque of about 180 inch-ounces at the speed of one revolution per minute. This low torque permits the use of a hysteresis motor, which is positive in its self-starting and unidirectional characteristics.

Referring to FIG. 4, it may be noted that in the aligned positions of the cam members 50 and 51, the eccentric member 96 is disposed such that the sensing arm 80 is located in its raised position. As a consequence, stalling of the motor 30 is precluded during those periods of time in which water is being supplied through the valve 45 and the tube 46 to the empty ice cube cells 18. The eccentric 96 rotates to pivot the linkage member 83 in a clockwise direction as viewed in FIG. 5 only after the cam surface or recess 58 of the cam member 51 has rotated out of alignment with the cam surfaces or grooves 53a–53d of the cam member 50, thus stopping the supply of water to the empty ice cube cells 18. This safety feature eliminates the possibility of supplying an excessive quantity of water to the cells 18 due to possible termination of the operation of the ice maker 10 while the cam members 50 and 51 are operatively aligned with one another and the water is flowing through the tube 46 to the empty cells 18.

Referring again to the iced harvest station 71, it is possible that in some instances mere inversion of the cells 18 may not be sufficient to cause complete dislodgment of the cubes. For this reason, a positive stripper 100 is provided in the path of movement of the inverted cells 18 beyond the abutment members 73 and 74 to strip any cubes from the inverted cells which may not have been completely dislodged.

The stripper 100 extends between the sidewalls 26 and 27, and as illustrated in FIGS. 1 and 2, comprises an elongated rod-like member having a pair of end portions 101 and 102 journalled for rotation in the sidewalls 26 and 27. A pair of generally U-shaped portions 103 and 104 are formed in alignment with the cube columns 19 and 20, and a coil spring 106 is wrapped around end portion 102 to bias the stripper 100 to the position thereof shown in FIG. 1.

The purpose of the U-shaped portions 103 and 104 is to reinvert the empty cube cells 18 so that they again extend inwardly of the belt 11 after the cubes have been stripped therefrom. Thus the inverted cells 18 are biased upwardly as viewed in FIG. 1 by the U-shaped portions 103 and 104, which enter the mouths of the cells 18 to insure complete recovery of the cells to the original configuration thereof. The completely reinverted cells, one of which is indicated at reference character 18d in FIG. 1, are then in condition for receiving a fresh supply of water from the fill tube 46.

In order to cushion the stalling effects of the linkage member 83 on the motor 30, the abutment member or flange 98 mounted on the armature shaft 97 may be made of rubber or other flexible material.

Another feature of the present invention involves the utilization of a thermal power element to shut down the operation of the ice maker 10 in the event that the ambient temperature rises above a predetermined level, for example, 30° F. Referring to FIG. 4 the thermal power element is indicated at reference numeral 106 and is mounted adjacent the flange 81. The power element 106 comprises a body portion 107 filled with wax or the like expansible material. A piston or plunger 108 protrudes from an end wall 108 of the body portion 107 in vertical alignment with the flange 81.

The position of the plunger 108 which obtains when the temperature surrounding the ice maker 10 is sufficiently low to freeze ice is shown in the solid lines of FIG. 4, or in a retracted position with respect to the body portion 107. In this position of the plunger 108 the flange 81 is able to pivot about the shaft through a normal arc. When the ambient temperature rises above 30° F., however, the plunger 108 moves to the extended position thereof shown in dashed lines at 108'. In this position the plunger 108 abuts the flange 81 and precludes pivotal movement of the flange 81 in a clockwise direction as viewed in FIG. 4.

Abutment of the plunger 108 against the flange 81 has the same effect in stopping the operation of the ice maker 10 as does the impediment to movement of the sensing arm 80 resulting from a high ice condition in the collection bin 70, that is, the linkage member 83 is urged axially into alignment with the armature shaft-mounted flange 98 to stall the motor 30. This situation prevails until the ambient temperature drops to a level at which the plunger 80 again moves to the retracted position. The motor 30 is then freed and operation of the ice maker 10 resumes.

Although minor modifications might be suggested by those versed in the art, it should be understood that I wish to embody within the scope of the patent warranted hereon all such modifications as reasonably come within the scope of my contribution to the art.

I claim as my invention:

1. An automatic ice cube maker comprising
   means forming cells for the formation of ice cubes,
   electric motor operated drive means including an electric motor rotatable in one direction for moving the respective cells sequentially in successive ice-freezing time periods between a water-fill station and an ice-harvest station,
      said drive means comprising an abutment member connected to the shaft of the electric motor for simultaneous movement therewith, and
   means for controlling the operating of said drive means as a function of the level of the harvested ice comprising
      movable linkage means operatively connected to said drive means and responsive to the level of harvested ice for normal movement between first and second operating positions during each of the successive ice-freezing time periods when a low harvested ice level obtains and for movement to a third position to engage said abutment member and to prevent further rotation of said electric motor shaft in said one direction when a high harvested ice level obtains.

2. The automatic ice cube maker as defined in claim 1 wherein said drive means comprises a self-starting unidirectional hysteresis electric motor.

3. The automatic ice cube maker as defined in claim 1 and including thermal power element means responsive to temperature ambient said ice maker for effecting movement of said linkage means to said third position thereof when the ambient temperature rises to a predetermined level.

4. An automatic ice cube maker comprising
   means forming cells for the formation of ice cubes,
   electric motor operated drive means for moving the respective cells sequentially in successive ice-freezing time periods between a water-fill station and an ice-harvest station,
      said drive means comprising an abutment member constructed and arranged for joint movement with the electric motor, and
   means for controlling the operation of said drive means as a function of the level of the harvested ice comprising
      movable linkage means operatively connected to said drive means and responsive to the level of harvested ice for normal movement between first and second operating positions during each of the successive ice-freezing time periods when a low harvested ice level obtains and for movement to a third position to engage said abutment member and to stall the electric motor when a high harvested ice level obtains,
         said abutment member comprising a soft resilient flange mounted on the shaft of the electric motor for cushioning the impact forces upon abutment with said movable linkage means in the stall position thereof.

5. An automatic ice cube maker comprising
   means forming cells for the formation of ice cubes,
   electric motor operated drive means for moving the respective cells sequentially in successive ice-freezing time periods between a water-fill station and an ice-harvest station,
      said drive means comprising an abutment member constructed and arranged for joint movement with the electric motor, and
   means for controlling the operation of said drive means as a function of the level of the harvested ice comprising
      movable linkage means operatively connected to said drive means and responsive to the level of harvested ice for normal movement between first and second operating positions during each of the successive ice-freezing time periods when a low harvested ice level obtains and for movement to a third position to engage said abutment member and to stall the electric motor when a high harvested ice level obtains, said control means comprising
         an ice level sensing arm associated with said movable linkage means and normally movable thereby between first and second positions upon movement of said linkage means between the first and second positions thereof,
         said sensing arm being constructed and arranged so that a high level condition of harvested ice serves to impede movement of the sensing arm between the first and second positions thereof to effect movement of said linkage means to the third position thereof.

6. The automatic ice cube maker as defined in claim 5 including
   shaft means mounting said linkage means and said sensing arm in side-by-side relation for independent pivotal movement between the first and second positions thereof,
   coupling means for pivotally interconnecting said linkage means and said sensing arm for joint pivotal movement thereof when a low harvested ice level condition obtains and for relative pivotal movement thereof when a high harvested ice level condition obtains,
      said relative pivotal movement of said linkage means and said sensing arm effecting movement of said linkage means to the stall position thereof.

7. The automatic ice cube marker as defined in claim 6 wherein said linkage means and said sensing arm are mounted for independent axial movement on said shaft means and wherein said coupling means comprises
   cooperating axially extending shoulder and axially inclined ramp surfaces formed on said linkage means and on said sensing arm and disposed in face-to-face relationship with one another, and
   means for relatively axially biasing said shoulder and ramp surfaces of said linkage means and said sensing arm into engagement with one another.

8. An automatic ice cube maker comprising
   means providing an ice cube-forming cell movable between a water-receiving position and an ice-harvesting position for receiving a supply of water from a fill-station and for dislodgement of cubes to a harvest station, respectively,
   a pair of control members relatively movable into and out of mutually aligned positions,
   drive means for moving the cell during successive ice-freezing time periods between said two positions and for moving said control members relative to one another into said aligned positions during only a portion of each of the successive time periods, and
   control means responsive to the aligned positioning of said control members for controlling the operation of the fill-station,
   said cell providing means comprising
      a rotatable sprocket-driven endless belt,
         said drive means comprising means for rotating said sprocket,
         said control members comprising a pair of cam members rotatable in synchronism with the sprocket, and said control means comprising electric switch means operated by the rotatable cam members.

9. The automatic ice cube maker as defined in claim 8 wherein said drive means comprises a motor driven gear train comprising a plurality of gears and wherein said cam members are connected to different ones of said gears operating at mutually different speeds.

10. An ice maker comprising an ice mold, means operable to supply water to said mold, means operable to remove ice from said mold, a collection bin for receiving the ice removed from said mold, drive means for operating said water supply means and said ice removal means in successive ice making operations, and means for controlling the operation of said drive means comprising, a shaft, a movable member mounted on said shaft for pivotal movement and for axial movement from an operating position to a stopping position, means operatively connecting said movable member to said drive means for pivoting said movable member after each ice removal operation, and means responsive to a given level of ice in said bin and to the pivotal movement of said movable member to shift said movable member axially on said shaft from said operating position to said stopping position when the ice in the bin reaches said given level to stop the ice making operation of said ice maker.

11. The ice maker as defined in claim 10 and including means for biasing said movable member axially to the operating position thereof.

12. The ice maker as defined in claim 10 wherein said drive means comprises an electric motor driven member movable through a path of travel so as to avoid the movable member in the operating position thereof and so as to abut the movable member in the stopping position thereof to stop the movement of the drive means.

13. The ice maker as defined in claim 10 wherein said ice level responsive means comprises, an ice level sensing arm located above the collection bin and mounted on said shaft adjacent said movable member and coupled thereto for joint pivotal movement therewith when the level of ice in the bin is below said given level and for relative pivotal movement therewith when the level of ice in the bin attains said given level and said sensing arm engages the ice to cause axial movement of the movable member to said stopping position thereof.

14. The ice maker as defined in claim 13 and including coupling means for coupling said sensing arm to said movable member comprising means forming cooperating saw teeth on said sensing arm and on said movable member in axially facing relation, and biasing means for biasing the cooperating saw teeth axially into abutting engagement with one another.

15. An automatic ice cube maker comprising sprocket means including a pair of sprocket members journalled for rotation on spaced parallel horizontal axes, an endless belt looped around said sprocket members for joint movement to provide upper and lower reaches thereof and having a plurality of ice cube-forming cup-shaped members formed therein in spaced relation along the length thereof, drive means including electrically energizable power means connected to said sprocket means in driving relation for moving said belt around said sprockets at a speed whereby said longitudinally spaced cup-shaped members are moved in succession past a water-fill station located adjacent the upper reach of the belt during successive time periods of predetermined duration, means providing a harvest station adjacent the lower reach of the belt past which said cup-shaped members are moved in succession, a pair of control members connected in driving relation to said drive means for relative movement into and out of a predetermined alignment with one another during each of said successive time periods, water control means responsive to the relative positioning of said control members for causing water to be supplied to the cup-shaped members as the cup-shaped members move in succession past the water-fill station but only during periods of alignment of said control members, and ice level sensing means operatively connected to said drive means and situated in proximity to the harvest station for stopping the operation of said power means in the non-aligned position of said control member upon attainment of a given level of harvested ice cubes at the ice harvest station.

16. The automatic ice cube maker as defined in claim 15 wherein said drive means comprises a gear train including a pair of gears operating at different speeds, and wherein said control members comprise a pair of rotatable cam members connected to said gears for joint rotation respectively therewith, said cam members having cooperating cam surfaces movable relative to one another into an out of mutual alignment.

17. The automatic ice cube maker as defined in claim 16 wherein said water control means comprises electric switch means having an operating arm engageable with said cam surfaces and movable to an operating position in response to movement of said cam surfaces into alignment with one another.

18. The automatic ice cube maker as defined in claim 17 and including means mounting said switch means for movement relative to said cam members for selectively adjusting the amount of water supplied to said cup-shaped members during each of said successive time periods.

References Cited

UNITED STATES PATENTS

| | | | |
|---|---|---|---|
| 2,510,400 | 6/1950 | Hurley | 62—137 |
| 3,144,078 | 9/1964 | Morton et al. | 62—344 X |
| 3,182,465 | 5/1965 | Miller et al. | 62—137 |
| 3,280,578 | 10/1966 | Linstromberg | 62—137 |
| 3,331,215 | 7/1967 | Shaw | 62—137 |

WILLIAM E. WAYNER, Primary Examiner

U.S. Cl. X.R.

62—72